US005688202A

United States Patent [19]
Bowen

[11] Patent Number: 5,688,202
[45] Date of Patent: Nov. 18, 1997

[54] POWERSHIFT TRANSFER CASE

[75] Inventor: Thomas Bowen, Santa Rosa, Calif.

[73] Assignee: New Venture Gear, Inc., Troy, Mich.

[21] Appl. No.: 677,057

[22] Filed: Jul. 9, 1996

[51] Int. Cl.$^6$ .................................................. B60K 17/348
[52] U.S. Cl. ............................ 475/199; 477/36; 477/35
[58] Field of Search ..................................... 475/199, 206, 475/218, 35, 36; 180/248, 249

[56] References Cited

U.S. PATENT DOCUMENTS

| | | |
|---|---|---|
| 3,845,671 | 11/1974 | Sharp et al. . |
| 3,848,691 | 11/1974 | Dolan . |
| 4,031,780 | 6/1977 | Dolan et al. . |
| 4,103,753 | 8/1978 | Holdeman . |
| 4,215,593 | 8/1980 | Shono et al. . |
| 4,344,335 | 8/1982 | Kawai . |
| 4,347,762 | 9/1982 | Holdeman . |
| 4,440,042 | 4/1984 | Holdeman . |
| 4,552,241 | 11/1985 | Suzuki . |
| 4,569,252 | 2/1986 | Harper . |
| 4,644,822 | 2/1987 | Batchelor . |
| 4,677,873 | 7/1987 | Eastman et al. . |
| 4,677,875 | 7/1987 | Batchelor . |
| 4,718,303 | 1/1988 | Fogelberg . |
| 4,770,280 | 9/1988 | Frost . |
| 4,776,444 | 10/1988 | Worner et al. . |
| 4,805,484 | 2/1989 | Hiraiwa . |
| 4,821,591 | 4/1989 | Adler . |
| 4,848,508 | 7/1989 | Smirl et al. . |
| 4,860,612 | 8/1989 | Dick et al. . |
| 4,883,138 | 11/1989 | Kameda et al. . |
| 4,976,671 | 12/1990 | Anderson . |
| 5,036,940 | 8/1991 | Takemura ............................ 180/249 |
| 5,046,998 | 9/1991 | Frost . |
| 5,054,335 | 10/1991 | Andrews . |
| 5,076,112 | 12/1991 | Williams . |
| 5,284,068 | 2/1994 | Frost . |
| 5,323,871 | 6/1994 | Wislon et al. . |
| 5,346,442 | 9/1994 | Eastman . |
| 5,411,447 | 5/1995 | Frost . |
| 5,443,429 | 8/1995 | Baxter, Jr. . |
| 5,522,777 | 6/1996 | Baxter et al. ............................ 477/36 |

Primary Examiner—Dirk Wright
Attorney, Agent, or Firm—Harness, Dickey & Pierce, P.L.C.

[57] ABSTRACT

A power transfer system is disclosed for a four-wheel drive vehicle operable for permitting a vehicle operator to select between various full-time and part-time four-wheel drive modes. The power transfer system includes a dual-planetary gear reduction unit that is operable for establishing high-range and low-range speed ratios, and a powershift mechanism that is adapted to permit the vehicle operator to shift on-the-fly for establishing full-time and part-time high-range and low-range four-wheel drive modes. The power transfer system includes an slip limiting/torque-biasing arrangement including an interaxle differential and a mode clutch operable for controlling the magnitude of speed differentiation and torque biasing across the interaxle differential.

19 Claims, 8 Drawing Sheets

Fig-5

| DRIVE MODE | 1ST RANGE CLUTCH | 2ND RANGE CLUTCH | MODE CLUTCH |
|---|---|---|---|
| FULL-TIME FOUR-WHEEL HIGH-RANGE | ACTUATED | NON-ACTUATED | MODULATED |
| PART-TIME FOUR-WHEEL HIGH-RANGE | ACTUATED | NON-ACTUATED | FULLY-ACTUATED |
| NEUTRAL | NON-ACTUATED | NON-ACTUATED | NON-ACTUATED |
| FULL-TIME FOUR-WHEEL LOW-RANGE | NON-ACTUATED | ACTUATED | MODULATED |
| PART-TIME FOUR-WHEEL LOW-RANGE | NON-ACTUATED | ACTUATED | FULLY-ACTUATED |

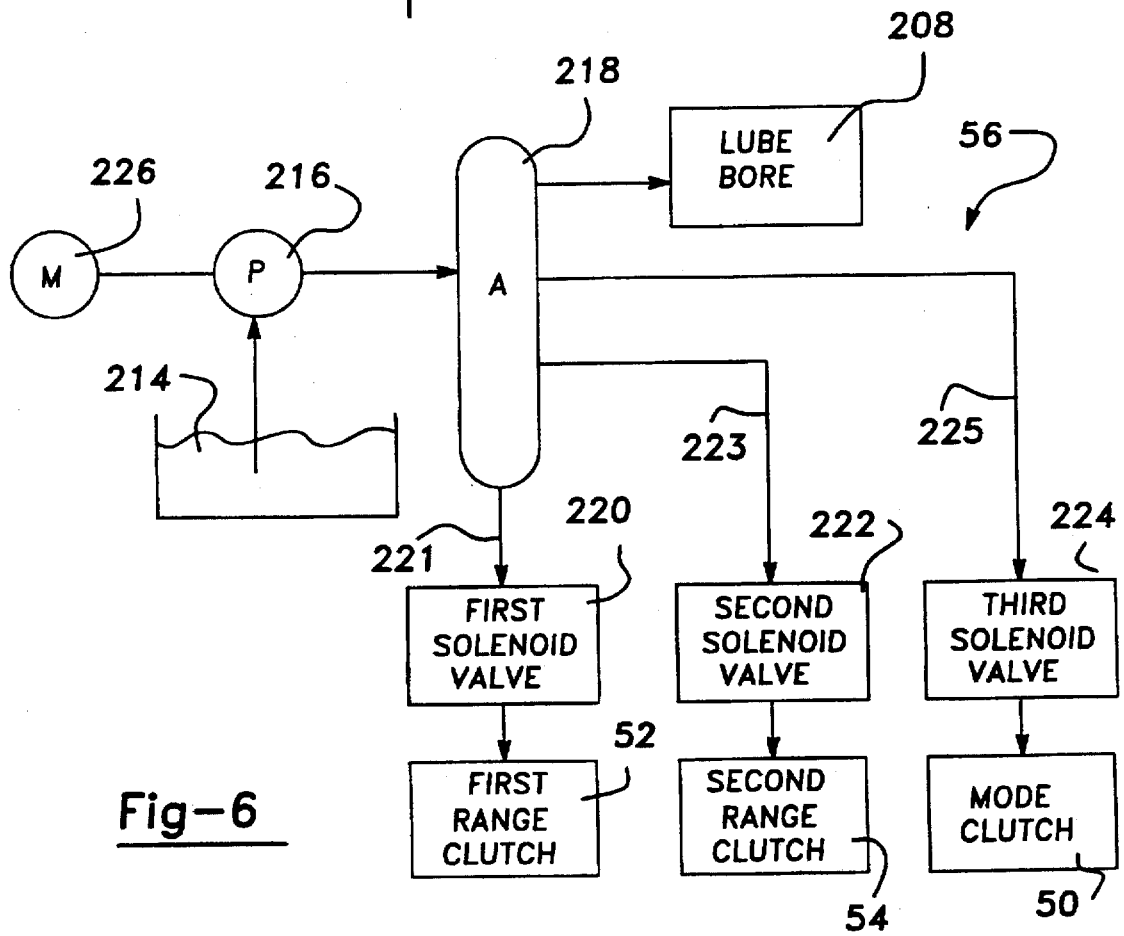

Fig-6

POWERSHIFT TRANSFER CASE

BACKGROUND OF THE INVENTION

The present invention relates to a power transfer system for automatically controlling the distribution of drive torque between the front and rear wheels of a four-wheel drive vehicle.

Due to increased consumer demand for four-wheel drive vehicles, a plethora of different power transfer systems are currently utilized for directing power (i.e., drive torque) to all four wheels of the vehicle. For example, in many "part-time" power transfer systems, a transfer case is incorporated into the driveline and is normally operable in a two-wheel drive mode for delivering drive torque to the driven wheels. When four-wheel drive is desired, a mode shift mechanism can be selectively actuated by the vehicle operator for directly coupling the non-driven wheels to the driven wheels for establishing a part-time four-wheel drive mode. As will be appreciated, motor vehicles equipped with such a part-time power transfer systems offer the vehicle operator the option of selectively shifting between the two-wheel drive mode during normal road conditions and the part-time four-wheel drive mode for operation under adverse road conditions. An example of a part-time transfer case is disclosed in commonly-owned U.S. Pat. No. 4,770,280 to Frost.

Alternatively, it is known to use "on-demand" power transfer systems for automatically directing power to the non-driven wheels, without any input or action on the part of the vehicle operator, when traction is lost at the driven wheels. Modernly, the on-demand feature is incorporated into the transfer case by replacing the mode shift mechanism with a clutch assembly that is interactively associated with an electronic control system and a sensor arrangement. During normal road conditions, the clutch assembly is maintained in a non-actuated condition such that drive torque is only delivered to the driven wheels. However, when the sensors detect a low traction condition at the driven wheels, the clutch assembly is automatically actuated to deliver drive torque on-demand to the non-driven wheels. Moreover, the amount of drive torque transferred through the clutch assembly to the non-driven wheels can be varied as a function of specific vehicle dynamics, as detected by the sensor arrangement. One example of such an "on-demand" power transfer system is disclosed in commonly-owned U.S. Pat. No. 5,323,871 to Wilson et al wherein the electronically-controlled clutch assembly is operable for automatically controlling the amount of drive torque transferred to the non-driven wheels as a function of the wheel speed difference (i.e., the wheel slip) between the driven and non-driven wheels.

As a further alternative, some vehicles are equipped with full-time power transfer system having a transfer case equipped with a center differential that functions to permit interaxle speed differentiation while transferring drive torque to both of the front and rear drivelines. To minimize loss of traction due to wheel slippage, full-time transfer cases are typically equipped with a slip limiting device for locking the center differential to prevent speed differentiation and, in effect, establishing a part-time four-wheel drive mode. Examples of manually-actuated differential lock-up arrangements are disclosed in commonly-owned U.S. Pat. No. 3,848,691 to Dolan and U.S. Pat. No. 4,677,873 to Eastman. An automatic differential lock-up arrangement is disclosed in commonly-owned U.S. Pat. No. 3,845,671 to Sharp et al. wherein an electrically-controlled clutch assembly is actuated to lock-up the center differential when speed differentiation due to a wheel slip condition is detected as exceeding a predetermined value. In addition, torque-biasing differential lock-up arrangements are disclosed in commonly-owned U.S. Pat. No. 4,031,780 to Dolan et al. and U.S. Pat. No. 5,046,998 to Frost, which both utilize a viscous coupling to progressively modify the torque distribution in proportion to the magnitude of the speed differentiation across the center differential. Finally, electronically-controlled full-time transfer cases are disclosed in U.S. Pat. No. 4,718,303 to Fogelberg and U.S. Pat. No. 4,860,612 to Dick et al. wherein an electromagnetic biasing clutch is provided across the center differential to controllably bias the torque delivered to the front and rear drivelines in response to wheel slip.

To accommodate differing road surfaces and conditions, many of the above-referenced transfer cases are equipped with a gear reduction unit for providing high-range (i.e., direct drive) and low-range (i.e., reduced ratio drive) speed ratios in conjunction with the various four-wheel drive modes. Most commonly, the gear reduction units used in such dual-speed transfer cases include either a layshaft arrangement or a planetary gear assembly. However, in most current four-wheel drive vehicles, the transfer case can only be shifted between the four-wheel low-range drive mode and the four-wheel high-range drive mode when the motor vehicle is in a substantially non-motive condition. Unfortunately, the need to stop the vehicle prior to shifting between the available four-wheel drive speed ranges is inconvenient, particularly upon encountering road conditions or surface terrain where continuation of the vehicle's rolling momentum would assist in overcoming the conditions encountered. As such, gear reduction units have been designed which permit the vehicle operator to shift "on-the-fly" from the four-wheel low-range drive mode into the four-wheel high-range drive mode without stopping the vehicle. For example, U.S. Pat. No. 5,054,335 to Andrews discloses a transfer case having a synchronized shift arrangement for a layshaft-type gear reduction unit while commonly-owned U.S. Pat. No. 5,346,442 to Eastman discloses a transfer case having a synchronized shift arrangement for a planetary-type gear reduction unit. However, while both designs advance the art, the need still exists to develop a gear reduction unit that can also be shifted "on-the-fly" from the four-wheel high-range drive mode into the four-wheel low-range drive mode. As a final alternative, U.S. Pat. No. 5,443,429 to Baxter discloses a transfer case having a hydraulically-shifted electronically-controlled powershift arrangement for a planetary-type gear reduction unit.

SUMMARY OF THE INVENTION

It is therefore an object of the present invention to provide an improved power transfer system for use in four-wheel drive vehicles having a transfer case equipped with a clutch assembly for automatically controlling the torque delivered to the front and rear wheels.

According to a preferred embodiment, the power transfer system of the present invention is operable for establishing a full-time four-wheel drive mode and includes a transfer case having an interaxle differential and a mode clutch arranged to control speed differentiation and torque biasing across the interaxle differential, sensors for detecting and generating input signals indicative of various dynamic and operational characteristics of the vehicle, and a controller for controlling actuation of the mode clutch in response to the sensor input signals. Under a first "on-demand" control scheme, the actuated condition of the mode clutch is automatically changed from a non-actuated state to a fully-actuated state when the sensor input signals indicate the occurrence of a vehicular condition exceeding a predefined threshold value. Under a second "on-demand" control scheme, the actuated condition of the mode clutch is controllably varied between its non-actuated and fully-actuated limits as a function of changes in the magnitude of one or more vehicular conditions detected by the sensors.

In addition to "on-demand" control of the mode clutch, the power transfer system of the present invention is further adapted to establish a part-time four-wheel drive mode. To this end, a mode select mechanism is provided for permitting selection of either of the full-time or part-time four-wheel drive modes and generating a mode signal indicative thereof. The mode signal is delivered to the controller for controlling actuation of the mode clutch. When the full-time four-wheel drive mode is selected, the mode clutch is automatically controlled under one of the above-noted on-demand control schemes. In contrast, when the part-time four-wheel drive mode is selected, the mode clutch is shifted into and maintained in its fully-actuated condition.

As a further feature of the present invention, the transfer case is equipped with a dual-planetary gear reduction unit and a hydraulically-actuated powershift mechanism that permit "on-the-fly" shifting between four-wheel high-range and low-range drive modes. Accordingly, the powershift mechanism permits the vehicle operator to shift the transfer case between the various full-time and part-time four-wheel high-range and low-range drive modes without stopping the vehicle. Alternatively, actuation of the mode clutch and the powershift mechanism can be controlled in response to the sensor input signals for automatically shifting the transfer case into the particular four-wheel drive mode best suited for the road conditions without input from the vehicle operator.

According to yet another feature of the present invention, the transfer case is equipped with a hydraulic control system for delivering pressurized fluid from a sump area to the hydraulically-actuated mode clutch and powershift mechanism.

BRIEF DESCRIPTION OF THE DRAWINGS

Further objects, features and advantages of the present invention will become apparent to those skilled in the art from analysis of the following written description, the accompanying drawings and the appended claims in which:

FIG. 5 is a chart listing the actuated condition of the mode clutch and the powershift mechanism for establishing various drive modes;

FIG. 6 is a schematic of the hydraulic system used for controlling actuation of the powershift mechanism and the mode clutch;

DETAILED DESCRIPTION OF THE INVENTION

Figure 1:
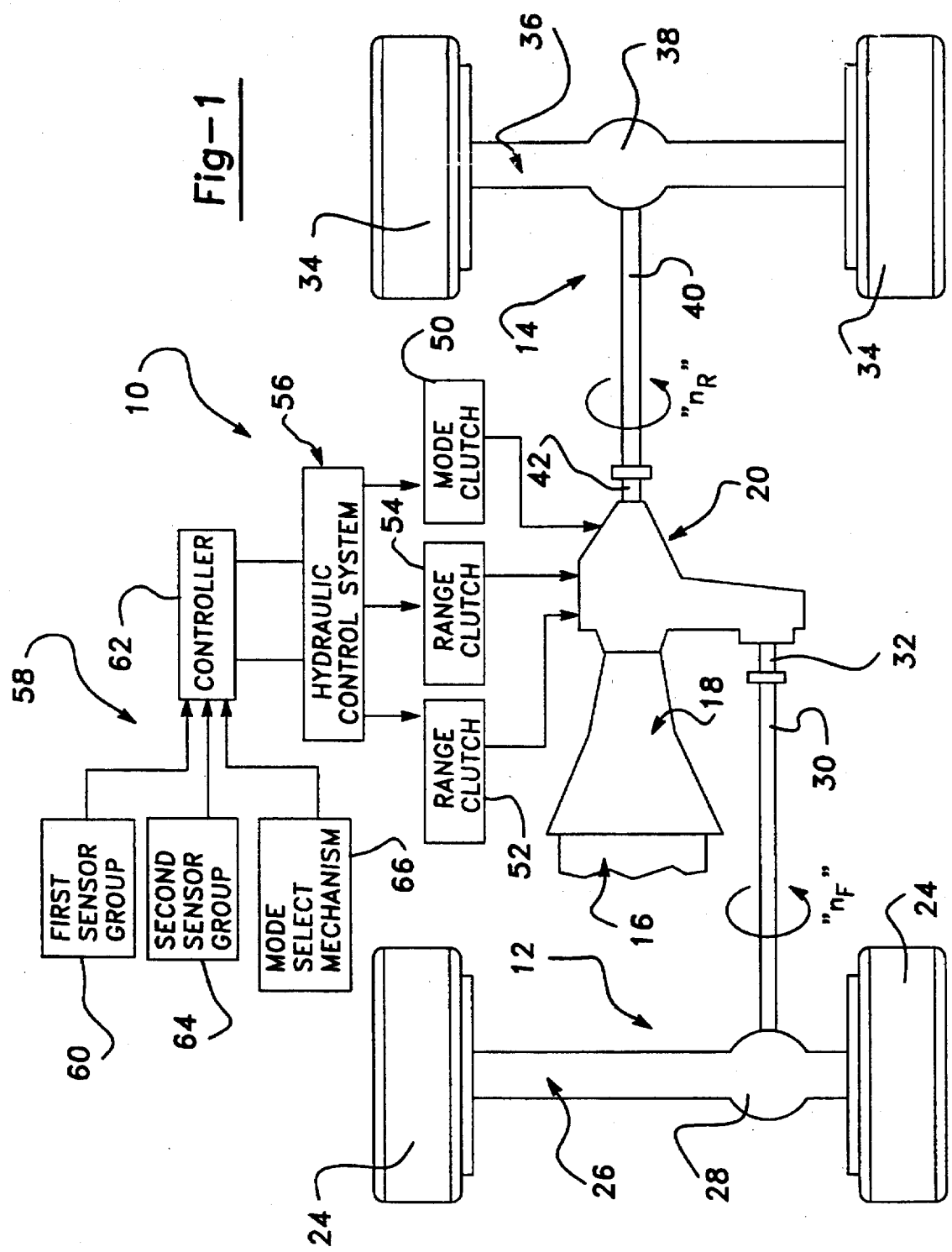
FIG. 1 is a schematic representation of a four-wheel drive motor vehicle equipped with the power transfer system of the present invention.

Referring now to the drawings, a drivetrain for a four-wheel drive vehicle is schematically shown interactively associated with a power transfer system 10 of the present invention. The motor vehicle drivetrain includes a front driveline 12 and a rear driveline 14 both drivable from a source of power, such as an engine 16, through a transmission 18 which may be of either the manual or automatic type. In the particular embodiment shown, the drivetrain is an all-wheel drive system which incorporates a transfer case 20 for transmitting drive torque from engine 16 and transmission 18 to front driveline 12 and rear driveline 14. Front driveline 12 includes a pair of front wheels 24 connected at opposite ends of a front axle assembly 26 having a front differential 28 that is coupled to one end of a front prop shaft 30, the opposite end of which is coupled to a front output shaft 32 of transfer case 20. Similarly, rear driveline 14 includes a pair of rear wheels 34 connected at opposite ends of a rear axle assembly 36 having a rear differential 38 coupled to one end of a rear prop shaft 40, the opposite end of which is interconnected to a rear output shaft 42 of transfer case 20.

Transfer case 20 is equipped with a dual-planetary gear reduction unit 44, a powershift mechanism 46, and a slip limiting/torque-biasing arrangement 48 including an interaxle differential 22 operably interconnecting front output shaft 32 and rear output shaft 42, and a mode clutch 50 for controlling the speed differentiation and torque biasing across interaxle differential 22. Powershift mechanism 46 includes a first range clutch 52 and a second range clutch 54 that are operable for establishing one of a high-range or a low-range drive connection across dual-planetary gear reduction unit 44. Transfer case 20 also includes a hydraulic control system 56 which is provided for actuating mode clutch 50 as well as first and second range clutches 52 and 54. Power transfer system 10 further includes an electronic control system 58 comprised of a first sensor group 60 for sensing specific dynamic and operational characteristics of the motor vehicle and generating sensor input signals indicative thereof, and a controller 62 for generating control signals in response to the sensor input signals. Controller 62 is adapted to send these control signals to electrically-controlled components of hydraulic system 56 for controlling the actuated condition of first range clutch 52, second range clutch 54, and mode clutch 50. Power transfer system 10 can optionally include a second sensor group 64 for generating one of more "operator-initiated" input signals that are indicative of the position of movable control elements under the control of the vehicle operator. The operator-initiated input signals are used for establishing control characteristics which, in combination with the sensor input signals, are used to generate control signals. Thus, transfer case 20 can be automatically shifted between the available drive modes based on the control signals. Power transfer system 10 may also include a mode select mechanism 66 for permitting the vehicle operator to select and shift transfer case 20 into one of the available drive modes.

With particular reference now to FIGS. 2 through 5, a preferred construction for transfer case 20 will now be described. Transfer case 20 is shown to include a housing 68 formed by a series of modular sections which are suitably interconnected by a plurality of threaded fasteners. An input shaft 70 is shown rotatably supported in housing 68. A transmission output shaft, partially shown at 72, is coupled (i.e., splined) to input shaft 70 such that both are rotatably driven by engine 16 of the motor vehicle. Dual-planetary gear reduction unit 44 is installed between input shaft 70 and a quill shaft 74 and is operable, in conjunction with powershift mechanism 46, for selectively establishing a direct speed ratio (i.e., high-range) and a reduced speed ratio (i.e., low-range) drive connection therebetween. Thus, a "high-range" drive mode is established when quill shaft 74 is driven at the direct speed ratio (i.e., 1:1) relative to input shaft 70 and a "low-range" drive mode is established when quill shaft 74 is driven at the reduced speed ratio (i.e., 0.50:1) relative to input shaft 70. Finally, dual-planetary gear reduction unit 44 is operable for establishing a "Neutral" non-driven mode for interrupting the transfer of drive torque from input shaft 70 to quill shaft 74.

Figure 2:
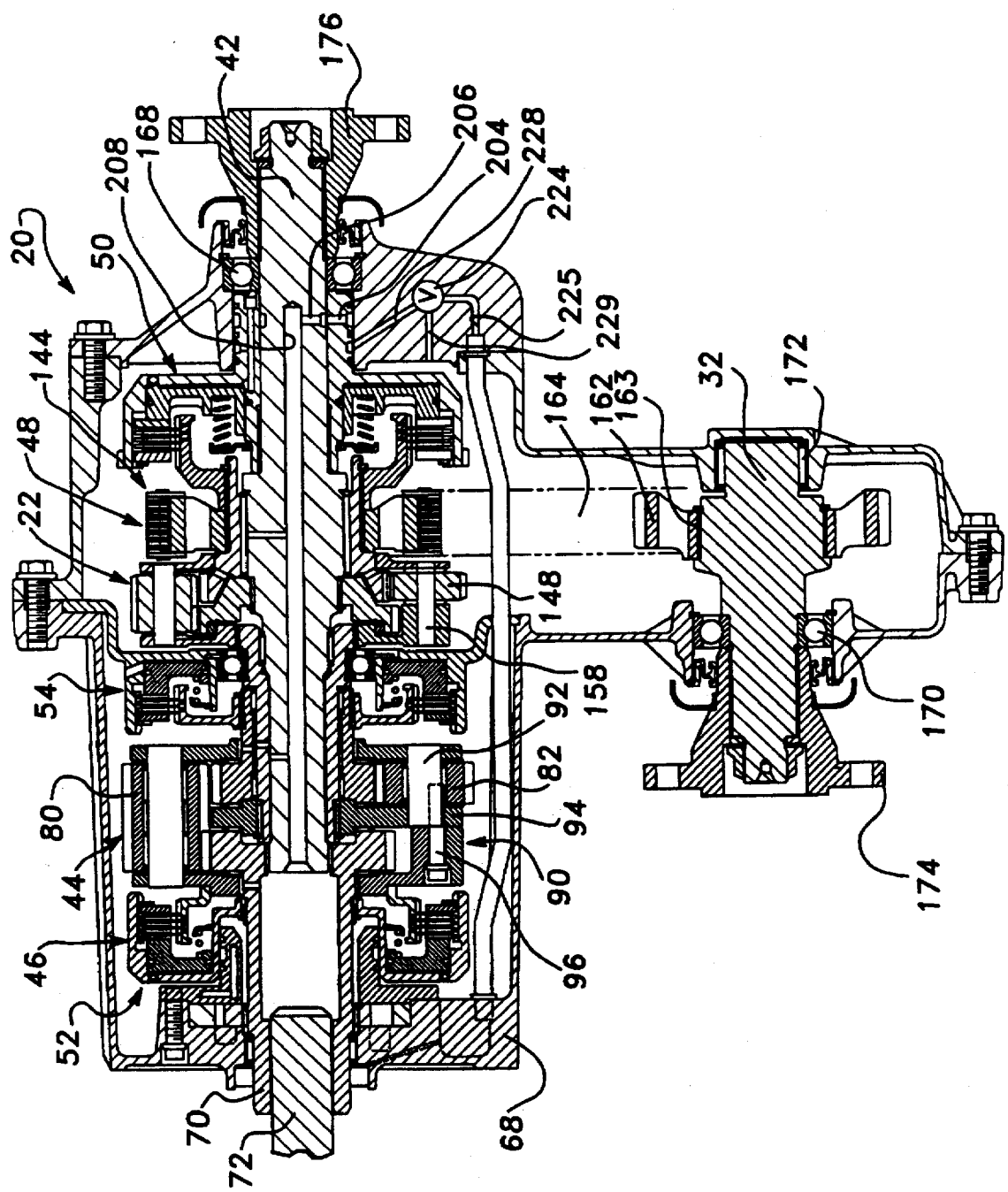
FIG. 2 is a cross-sectional view illustrating the powershift transfer case of the present invention.
Figure 3:
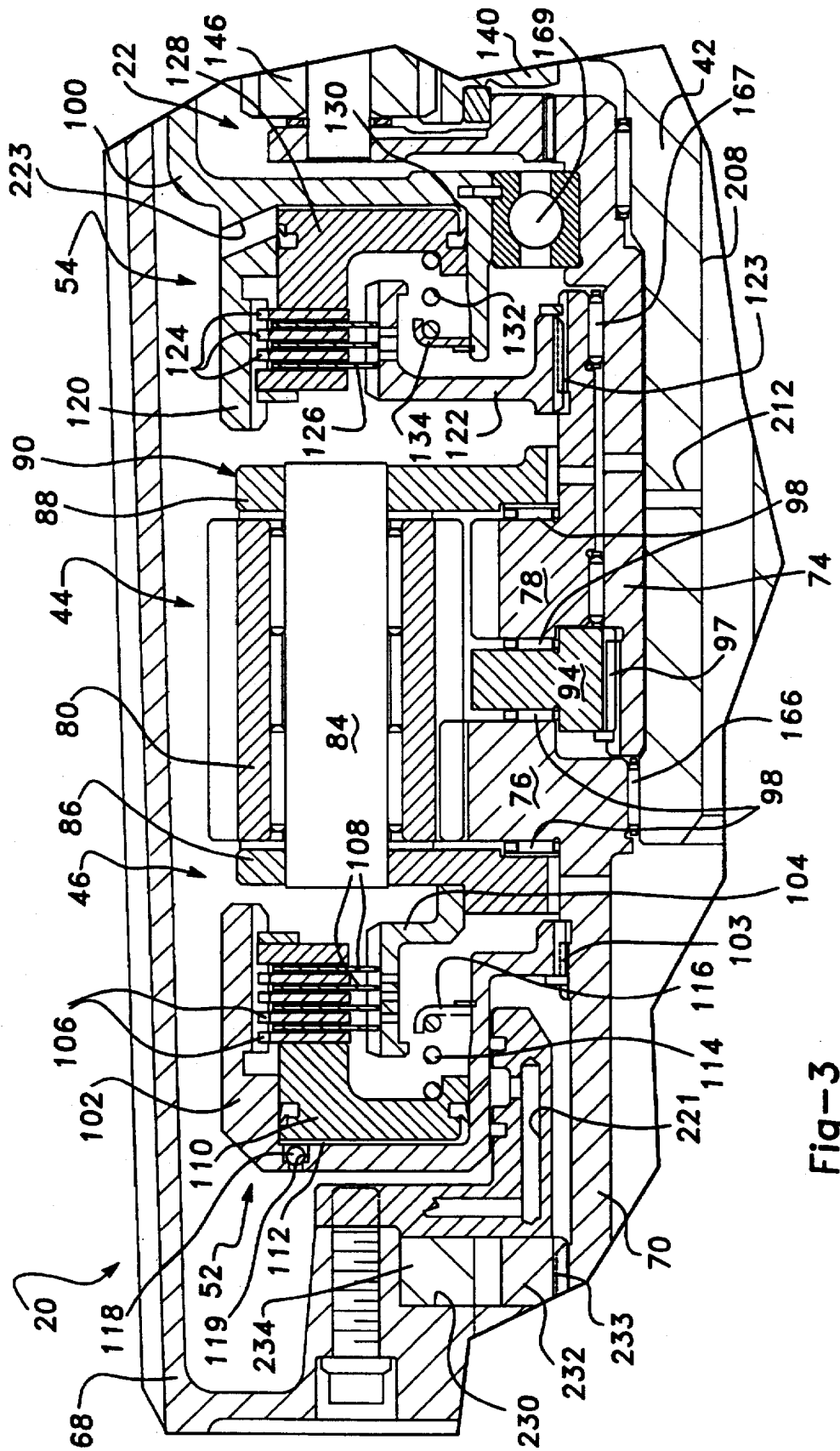
FIG. 3 is an enlarged fragmentary view of FIG. 2 illustrating the dual-planetary gear reduction unit and the powershift mechanism in greater detail.

As best seen from FIGS. 2 and 3, dual-planetary gear reduction unit 44 includes a first sun gear 76 integrally formed on input shaft 70, a second sun gear 78 rotatably supported on quill shaft 74, a set of full-length or first planet gears 80 meshed with first sun gear 76, and a set of half-length or second planet gears 82 each meshed with one of first planet gears 80 and second sun gear 78. Each full-length planet gear 80 is rotatably supported on a pinion shaft 84, the opposite ends of which are mounted in front and rear carrier rings 86 and 88, respectively, of a carrier assembly 90. Similarly, each half-length planet gear 82 is rotatably supported on a pinion shaft 92, the opposite ends of which are mounted in central and rear carrier rings 94 and 88, respectively, of carrier assembly 90. Preferably, carrier rings 86, 94, and 88 are secured together by suitable fasteners, such as bolts 96. Central carrier ring 94 is shown to be directly coupled via a splined connection 97 to quill shaft 74. To facilitate relative rotation between the various components of dual-planetary gear reduction unit 44, suitable thrust bearings 98 are shown positioned between the carrier rings and the sun gears.

According to the presently preferred embodiment, first sun gear 76 has its gear teeth located at a first radial distance from the principal axis of quill shaft 74 while the gear teeth of second sun gear 78 are located at a second lesser radial distance relative to the principal axis. Each full-length planet gear 80 extends longitudinally substantially the full axial extent between front and rear carrier rings 86 and 88. Similarly, each half-length planet gear 82 extends longitudinally substantially the full axial extent between center and rear carrier rings 94 and 88. To provide the desired reduced speed ratio across dual-planetary gear reduction unit 44, first sun gear 76 has forty-three teeth, second sun gear 78 has thirty-eight teeth, full-length planet gears 80 have eighteen teeth, and half-length planet gears 82 have twenty-one teeth.

To provide means for selectively establishing the high-range and low-range drive connections between input shaft 70 and quill shaft 74, powershift mechanism 46 is provided in conjunction with dual-planetary gear reduction unit 44. As will be detailed, powershift mechanism 46 is operable for shifting transfer case 20 "on-the-fly" between the four-wheel high-range and low-range drive modes. As best seen from FIG. 3, powershift mechanism 46 includes first range clutch 52 and second range clutch 54. In general, first range clutch 52 is operable for establishing the high-range drive connection between input shaft 70 and quill shaft 74 by directly coupling carrier assembly 90 of dual-planetary gear reduction unit 44 to input shaft 70. Since central carrier ring 94 is fixedly splined to quill shaft 74, direct coupling of carrier assembly 90 to input shaft 70 results in quill shaft 74 likewise being driven without reduction by input shaft 70. In contrast, second range clutch 54 is operable for establishing the low-range drive connection between input shaft 70 and quill shaft 74 by coupling second sun gear 78 to a central web plate 100 of housing 68. Such a coupling results in the braking of second sun gear 78 which, in turn, causes carrier assembly 90 to be rotatably driven at the desired reduced speed ratio relative to input shaft 70. An advantage associated with dual-planetary gear reduction unit 44 is that there is no relative motion between the gears when the high-range drive mode is established which significantly minimizes the transmission of noise. Furthermore, in the high-range drive mode, the gears are not loaded which promotes extended gear and bearing life.

First range clutch 52 is a multi-disc friction clutch assembly having an outer drum housing 102 fixed via splined connection 103 to input shaft 70, an inner drum housing 104 fixed (i.e., welded) to front carrier ring 86, and a clutch pack of alternately interleaved clutch plates 106 and 108. Clutch plates 106 are splined for rotation with outer drum housing 102 while clutch plates 108 are splined for rotation with inner drum housing 104. A piston 110 is mounted for sliding movement on outer drum housing 102 and is sealed relative thereto in a fluid-tight manner to define an oil chamber 112 therewith. Piston 110 is movable between a "released" position disengaged from the clutch pack and an "engaged" position exerting a clamping force on the clutch pack. In the embodiment shown, a biasing spring 114 is preloaded between a spring retainer 116 secured to outer drum housing 102 and piston 110 for urging piston 110 toward its released position. As will be detailed, the supply of pressurized fluid to oil chamber 112 for moving piston 110 is controlled by hydraulic system 56. Thus, piston 110 moves to its engaged position when first range clutch 52 is in an actuated mode for coupling carrier assembly 90 to input shaft 70 for direct rotation therewith. As shown in FIG. 3, when first range clutch 52 is in its actuated mode, a check valve element, such as a ball 118, is held within an angled valve seat portion of an exhaust port 119 formed in outer drum 102 by fluid pressure within oil chamber 112, thereby inhibiting exhaust flow through exhaust port 119. In contrast, when piston 110 is located in its released position, first range clutch 52 is in a non-actuated mode and carrier assembly 90 is free to rotate relative to input shaft 70. When first range clutch 52 is in its non-actuated mode, the supply of pressurized fluid to oil chamber 112 is cut off and centrifugal force on ball 118 causes it to move away from the valve seat portion of exhaust port 119, thereby allowing the fluid to exit oil chamber 112. Use of such one-way check valves prevents partial engagement of first range clutch 52 due to centrifugal forces applied to residue oil in oil chamber 112.

Second range clutch 54 is likewise a multi-disc friction clutch assembly including an outer drum 120 formed integrally with web plate 100, an inner drum 122 fixed via a splined connection 123 to second sun gear 78, and a clutch pack having clutch plates 124 splined for rotation with outer drum 120 and clutch plates 126 interleaved with clutch plates 124 and splined for rotation with inner drum 122. A piston 128 is mounted for sliding movement relative to outer drum 120 and sealed relative thereto in a fluid-tight manner to define an oil chamber 130 therewith. Piston 128 is movable between a "released" position disengaged from the clutch pack and an "engaged" position exerting a clamping force on the clutch pack. A biasing spring 132 is preloaded between a spring retainer 134 fixed to outer drum 120 and piston 128 for biasing piston 128 toward its released position. Hydraulic system 56 is also operable for controlling the supply of pressurized fluid to oil chamber 130 for controlling movement of piston 128. When piston 128 is located in its released position, second range clutch 54 is in a non-actuated mode and second sun gear 78 is free to rotate relative to stationary web plate 100. In contrast, movement of piston 128 to its engaged position results when second range clutch 54 is in an actuated mode, whereby second sun gear 78 is coupled to web plate 100 and thereby held stationary. While not shown, one or more check valves, similar to those associated with first range depth 52, would be installed in outer drum 120 of second range clutch 54 for providing a similar function.

When it is desired to establish the high-range drive mode, first range clutch 52 is shifted into its actuated mode and second range clutch 54 is shifted into its non-actuated mode. When it is desired to establish the low-range drive mode, first range clutch 52 is shifted into its non-actuated mode and second range clutch 54 is shifted into its actuated mode. Finally, the Neutral non-driven mode is established when first range clutch 52 and second range clutch 54 are both shifted into their respective non-actuated modes, whereby driven rotation of first sun gear 76 causes first and second planet gears 80 and 82 to rotate about their respective pinion shafts 84 and 92 which, in turn, causes second sun gear 78 to be rotatably driven. As a result, carrier assembly 90 is not rotatably driven in response to rotation of first sun gear 76, whereby quill shaft 74 is also maintained in a non-driven state.

Figure 4:
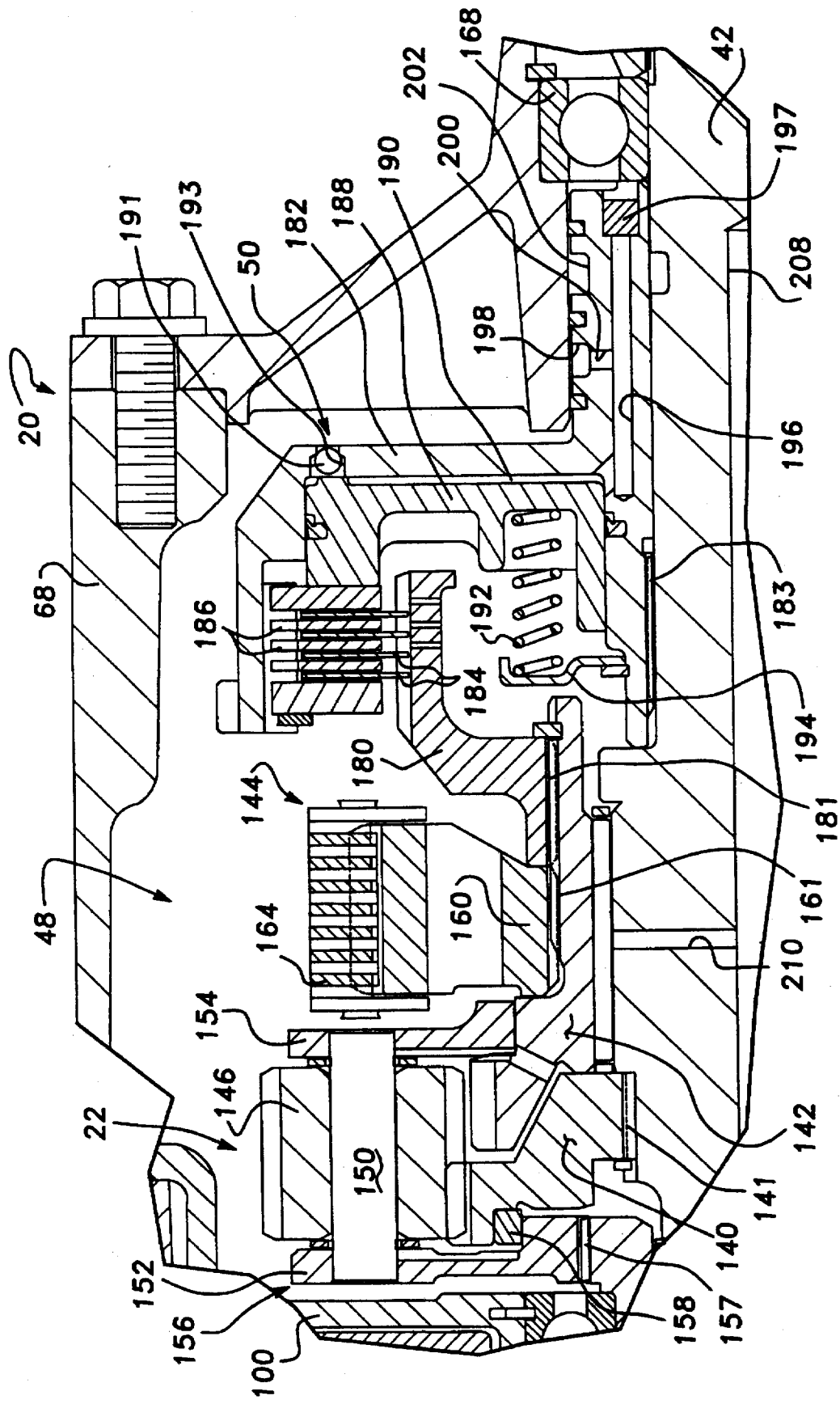
FIG. 4 is another enlarged fragmentary view of FIG. 2 showing the interaxle differential and the mode clutch in greater detail.

With particular reference now to FIGS. 2 and 4, the various components associated with slip limiting/torque-biasing arrangement 48 in transfer case 20 will now be described. Specifically, interaxle differential 22 is provided for mechanically coupling quill shaft 74 to front output shaft 32 and rear output shaft 42 to facilitate speed differentiation while distributing drive torque therebetween. While any suitable differential unit is contemplated for use with transfer case 20, interaxle differential 22 is preferably a dual-planetary gearset having a first sun gear 140 fixed via a splined connection 141 to rear output shaft 42, a second sun gear 142 fixed via a chain drive assembly 144 to front output shaft 32, a set of full-length or first pinion gears 146 each meshed with first sun gear 140, and a set of half-length or second pinion gears 148 each meshed with one of first pinion gears 146 and second sun gear 142. Each first pinion gear 146 is rotatably supported on a long pinion shaft 150, the opposite ends of which are mounted in front and rear carrier rings 152 and 154, respectively, of a carrier assembly 156. Similarly, each second pinion gear 148 is rotatably supported on a short pinion shaft 158, the opposite ends of which are likewise mounted to carrier rings 152 and 154. Each set of first pinion gears 146 and second pinion gears 148 is equally-spaced on carrier assembly 156 with one first pinion gear 146 constantly meshed with one second pinion gear 148. Front carrier ring 152 is shown to be coupled via a splined connection 157 to quill shaft 74. A separator ring 158 is located between front carrier ring 152 and first sun gear 140 to facilitate relative rotation therebetween. Likewise, rear carrier ring 154 is shown to be rotatably supported on an outer peripheral surface of second sun gear 142.

Chain drive assembly 144 includes a drive sprocket 160 fixed via a splined connection 161 to second sun gear 142, a driven sprocket 162 fixed via a splined connection 163 to front output shaft 32, and a continuous chain 164 interconnecting driven sprocket 162 to drive sprocket 160. Thus, driven rotation of quill shaft 74 causes interaxle differential 22 to drive front and rear output shafts 32 and 42, respectively, at a predetermined speed ratio with respect to one another. The torque distribution (i.e., the torque split) normally delivered across interaxle differential 22 to output shafts 32 and 42 is a ratio determined by the particular gear geometry associated with the intermeshed gear components of the dual-planetary gearset. Rear output shaft 42 is shown to have its forward end rotatably supported by a bearing assembly 166 that is mounted in a piloted bore in input shaft 70 and by a bearing assembly 167 mounted in a piloted bore in quill shaft 74. In turn, quill shaft 74 is rotatably supported by a bearing assembly 169 mounted to central web plate 100. Bearing assembly 166 also rotatably supports first sun gear 76. The rearward end of rear output shaft 42 is rotatably supported by a bearing assembly 168 mounted to housing 68. Likewise, front output shaft 32 is shown rotatably supported in housing 68 via bearing assemblies 170 and 172. Finally, a front flange 174 and a rear flange 176 are shown respectively mounted to front and rear output shafts 32 and 42 for facilitating otherwise conventional interconnection of each to front and rear drivelines 12 and 14, respectively.

Mode clutch 50 is installed within transfer case 20 for controlling speed differentiation and the resulting torque distribution between front output shaft 32 and rear output shaft 42. As best seen from FIGS. 2 and 4, mode clutch 50 is a multi-plate friction clutch assembly which includes an inner drum 180 fixed via a splined connection 181 to second sun gear 142, an outer drum housing 182 fixed via a splined connection 183 to rear output shaft 42, and a clutch pack having two sets of alternately interleaved friction clutch plates that can be frictionally compressed for limiting speed differentiation and biasing the torque distribution across interaxle differential 22. In particular, a set of inner clutch plates 184 are mounted via a splined connection to inner drum 180 for rotation with second sun gear 142 and front output shaft 32. Likewise, a set of outer clutch plates 186 are mounted via a splined connection to outer drum 182 for rotation with first sun gear 140 and rear output shaft 42. The interleaved clutch plates 184 and 186 are supported for axial sliding movement to establish frictional contact therebetween.

Mode clutch 50 is shown to further include a piston 188 supported for axial sliding movement on outer drum 182 and which is operable for frictionally compressing the interleaved clutch plates. Piston 188 has both of its inner and outer peripheral surfaces sealed in a fluid-tight manner relative to outer drum 182 to form a pressure chamber 190 therewith. Piston 188 is movable between a "released" position disengaged from the clutch pack and an "fully-engaged" position exerting a maximum clamping force on the clutch pack. When piston 188 is in its released position, mode clutch 50 is in its non-actuated mode for permitting unrestricted differentiation between front output shaft 32 and rear output shaft 42, thereby establishing a full-time (i.e., differentiated) four-wheel drive mode. In contrast, movement of piston 188 to its fully-engaged position results when mode clutch 50 is in its fully-actuated mode for inhibiting such speed differentiation between rear output shaft 42 and front output shaft 32, thereby establishing a part-time (i.e., non-differentiated) four-wheel drive mode. A return spring 192 is disposed under compression between piston 188 and a retainer plate 194 for normally urging piston 188 away from the interleaved clutch plates and toward its released position. Hydraulic system 56 is again operable for controlling movement of piston 188 via control of the pressurized fluid supplied to pressure chamber 190. As with the range clutches, a check valve having a ball 191 retained within an angled valve seat portion of an exhaust port 193 is provided for sealing pressure chamber 190 when mode clutch 50 is in its fully-actuated mode and for allowing fluid to exit chamber 190 when mode clutch 50 is in its non-actuated mode. According to the embodiment shown, a passageway 196 is formed in outer drum 182 that communicates with pressure chamber 190. Passageway 196 is sealed in a fluid-tight manner at its rear end by a plug member 197. A first circumferential groove 198 formed in the outer peripheral surface of outer drum 182 communicates with passageway 196 via a radial port 200. As is also seen, a second circumferential groove 202 formed in the outer peripheral surface of outer drum 182 communicates with a radial flow passage 204 which, in turn, communicates with a radial bore 206 formed in rear output shaft 42. Radial bore 206 communicates with a lubrication bore 208 formed centrally in rear output shaft 42 which, by way of radial ports 210 and 212 provides lubrication to the various components rotatably mounted on rear output shaft 42.

Referring to FIG. 6, the various components associated with hydraulic system 56 are schematically shown. Preferably, hydraulic system 56 is contained within and/or mounted to transfer case 20. Hydraulic system 56 includes a reservoir 214 containing hydraulic fluid, a pump 216, and an accumulator 218. Pump 216 draws fluid from reservoir 214 and supplies fluid under pressure to accumulator 218 where the hydraulic pressure is stored. A first electronically-controlled solenoid valve 220 is interposed in a supply line 221 between accumulator 218 and first range clutch 52 for controlling the supply of hydraulic pressure to and from oil chamber 112. A second electronically-controlled solenoid valve 222 is interposed in a supply line 223 between accumulator 218 and second range clutch 54 for controlling the supply of hydraulic pressure to and from oil chamber 130. A third electronically-controlled solenoid valve 224 is interposed in a supply line 225 between accumulator 218 and mode clutch 50 for controlling the supply of hydraulic pressure to pressure chamber 190. Preferably, first and second solenoid valves 220 and 222 are of the on/off variety while third solenoid valve 224 is of the variable output type. Finally, a supply line 227 interconnects accumulator 218 to second groove 202 for providing a continuous supply of lubricating fluid to lubrication bore 208.

Hydraulic pressure is generated by pump 216 which may be driven by a rotary component of transfer case 20 or, optionally, by means of an electrically-controlled motor 226. Pump 216 functions to maintain a predetermined fluid pressure in accumulator 218 which, in turn, supplies fluid under pressure to solenoid valves 220, 222 and 224. If equipped, motor 226 is operated depending on whether pressure in hydraulic system 56 is above the predetermined fluid pressure set by electronic control system 58 for maintaining the hydraulic pressure at all times during operation of the motor vehicle. Electronic control system 58 is operable such that controller 62 controls actuation of solenoid valves 220, 222 and 224 to establish the desired four-wheel drive mode. Thus, the actuated condition of solenoid valves 220 and 222 controls whether first range clutch 52 and second range clutch 50 are respectively shifted into their non-actuated or actuated modes. Similarly, the actuated condition of third solenoid valve 224 controls actuation of mode clutch 50 between its non-actuated and fully-actuated modes. A supply port 228 of third solenoid valve 224 is shown to be in fluid communication with first groove 198 for delivery of hydraulic fluid thereto from accumulator 218 via supply line 225. Additionally, an exhaust port 229 is shown for permitting the fluid discharged from oil chamber 190 to return to reservoir 214. While not shown, it will be obvious that hydraulic fluid discharged from the oil chambers of each of the range clutches is likewise returned to reservoir 214.

According to the particular embodiment shown, pump 216 is of the shaft driven gerotor type that is mounted in a pump chamber 230 formed in a front flange segment of housing 68. Pump 216 includes a rotor 232 that is fixed via a splined connection 233 to input shaft 70 for rotation therewith. Rotor 232 is an eccentric member having a predetermined number of external tooth-like lobes formed thereon. Pump 216 also includes a pump ring 234 that is non-rotatably fixed within pump chamber 230 and includes a predetermined number of internal tooth-like lugs formed therein. Driven eccentric rotation of rotor 232 relative to stationary pump ring 234 functions to draw fluid from reservoir 214 into the inlet side of pump 216 and deliver pressurized fluid to accumulator 218.

As noted, first solenoid valve 220 and second solenoid valve 222 are preferably of the on/off variety such that range clutches 52 and 54 are either actuated or non-actuated. However, third solenoid valve 224 can be controlled under either of an ON/OFF control scheme or an ADAPTIVE control scheme. Under the ON/OFF control scheme, mode clutch 50 is normally maintained in its non-actuated state to permit speed differentiation between front and rear output shafts 32 and 42, respectively. In this condition, transfer case 20 is operating in its full-time four-wheel drive mode. However, when the sensor input signals indicate a vehicular condition exceeding a predetermined value, third solenoid valve 224 is actuated for shifting mode clutch 50 into its fully-actuated mode for locking-up interaxle differential 22 such that front and rear output shafts 32 and 42 are, in effect, rigidly coupled for inhibiting speed differentiation therebetween and, in effect, establishing the part-time four-wheel drive mode. Preferably, the primary vehicular condition used for controlling actuation of mode clutch 50 is the interaxle speed differential between front drive shaft 32 and rear drive shaft 42. Once the sensor input signals detect that the magnitude of the vehicular condition has fallen below the predetermined value, controller 62 signals third solenoid valve 224 to return mode clutch 50 to its non-actuation state.

Controller 62 can alternatively be programmed utilizing the ADAPTIVE control scheme to regulate the actuated condition of mode clutch 50 between its non-actuated and fully-actuated limits for proportionally varying the magnitude of speed differentiation and drive torque transmitted across interaxle differential 22 as a function of the sensor input signals. Under such a scenario, third solenoid valve 224 would most likely be a variable orifice-type control valve capable of regulating fluid pressure. In operation, mode clutch 50 increases the drive torque delivered to the slower turning output shaft while concurrently decreases the drive torque delivered to the faster turning output shaft in an amount equal to the torque capacity of mode clutch 50 at a given actuated state. Under either of the above-noted control schemes, control over actuation of mode clutch 50 is automatic and does not require any act or mode selection on the part of the vehicle operator.

Transfer case 20 is capable of establishing at least five distinct operative modes, namely, a full-time four-wheel high-range drive mode, a part-time four-wheel high-range drive mode, a Neutral non-driven mode, a full-time four-wheel low-range drive mode, and a part-time four-wheel low-range drive mode. The particular operational mode is established by the actuated state of first range clutch 52, second range clutch 54, and mode clutch 50. Transfer case 20 can be shifted automatically or selectively. Under the automatic shift control scenario, controller 62 will determine, based on all the sensor inputs, the optimum drive mode and control actuation of the clutches in response thereto. However, the vehicle operator may select a desired operative drive mode via mode select mechanism 66 which, in turn, signals controller 62 of the selection. Mode select mechanism 66 can take the form of any mode selector device which is under the control of the vehicle operator for generating a mode signal indicative of the specific mode selected. In one form, the mode selector device may be an array of dash-mounted push button switches. Alternatively, the mode selector device may be a manually-operable shift lever sequentially movable between a plurality of positions corresponding to the available operational modes which, in conjunction with a suitable electrical switch arrangement, generates a mode signal indicating the mode selected. In either form, mode select mechanism 66 offers the vehicle operator the option of deliberately choosing between the various operative drive modes.

Assuming availability of all of the above-noted operative modes, the various actuated state for each clutch is shown in the table at FIG. 5. Moreover, when either of the full-time four-wheel high-range or low-range drive modes is selected, power transfer system 10 is operable for causing third solenoid valve 224 to continuously regulate the actuated condition of mode clutch 50 as a function of the sensor and operator-initiated input signals. According to the present invention, when transfer case 20 is operating in either of the full-time four-wheel high-range or low-range drive modes, slip limiting/torque-biasing arrangement 48 is active for "on-demand" control of mode clutch 50. Specifically, the actuated state of mode clutch 50 is continuously monitored and varied in accordance with specific predefined relationships established based on the current value of the sensor and operator-initiated input signals under either of the ON/OFF or ADAPTIVE control schemes. Thus, in the full-time four-wheel drive modes, power transfer system 10 acts as an on-demand system for continuously monitoring and automatically regulating the actuated condition of mode clutch 50 in a manner that is independent of any deliberate action by the vehicle operator.

Figure 7:
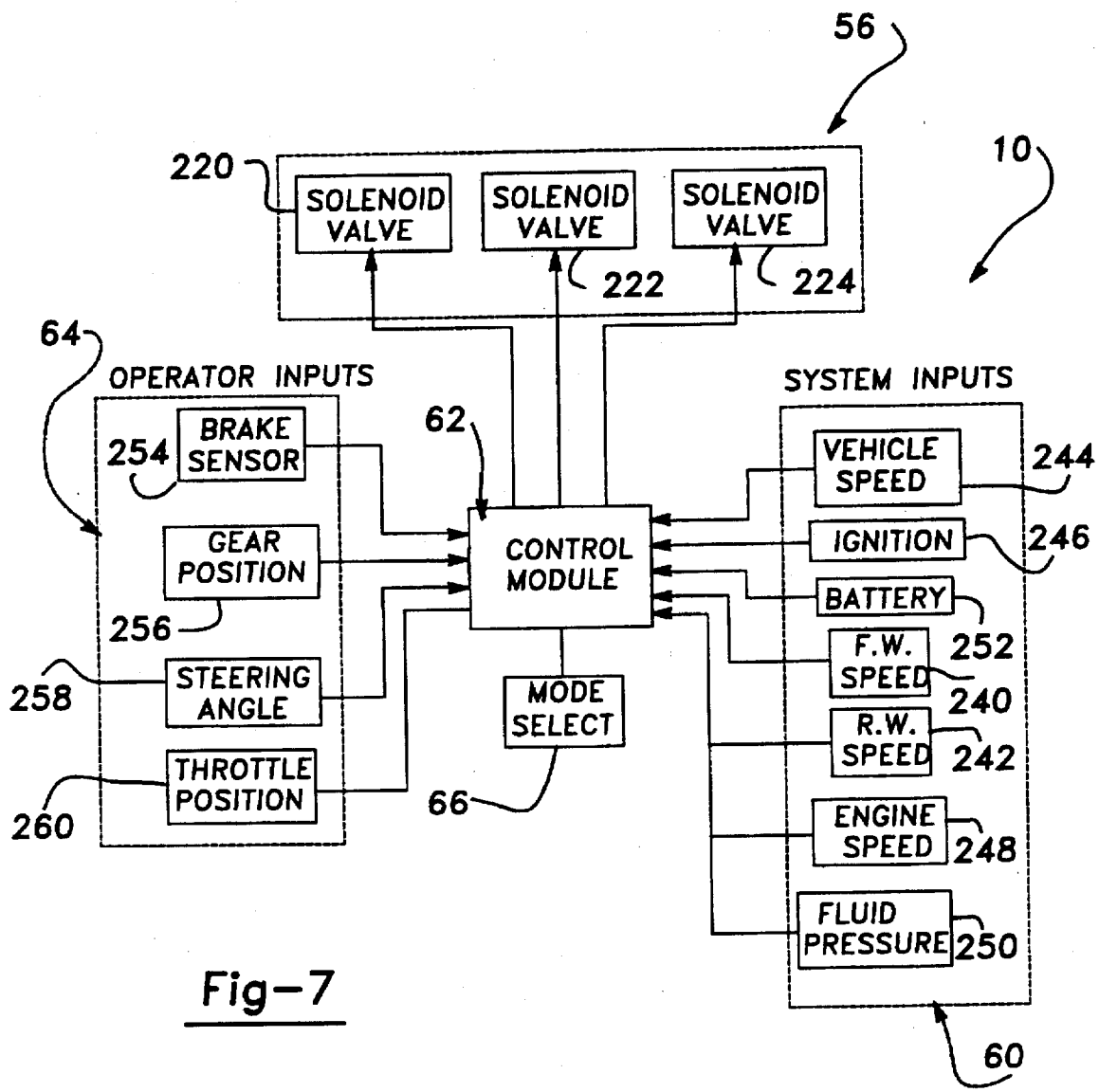
FIG. 7 is a block diagram of an electronic control system used for controlling the hydraulic system.

With particular reference now to FIG. 7, a block diagram of a control system associated with power transfer system 10 is shown. Preferably, controller 62 is a microprocessor having signal processing and information storage capabilities. In addition, first sensor group 60 is shown as a group of various "system" sensors that are provided for detecting and signaling specific dynamic and operational characteristics of the motor vehicle. The input signals generated by the "systems" sensors are delivered to controller 62. Preferably, these sensors include a front speed sensor 240 for sensing the rotational speed ($n_F$) of front prop shaft 30, a rear speed sensor 242 for sensing the rotational speed ($n_R$) of rear prop shaft 40, a vehicle speed sensor 244 for sensing a vehicle speed (V), an ignition switch 246 for signalling the operational status of the vehicle, an engine speed sensor 248 for sensing rotational speed (RPM) of transmission output shaft 72, a pressure sensor 250 for sensing the hydraulic pressure in accumulator 218, and a battery input 252 for powering electronic control system 58. In vehicles equipped with an anti-lock brake system (ABS), the original equipment ABS sensors provided at each wheel can be used for determining an "average" front drive shaft speed and rear drive shaft speed. Alternatively, front and rear speed sensors 240 and 242, respectively, can be arranged for directly measuring the speed of front output shaft 32 and rear output shaft 42, respectively. Moreover, it is possible for vehicle speed sensor 244 to be eliminated with the vehicle speed signal (V) being computed from the lower valued one of rotational speed signals ($n_F$) and ($n_R$).

The control system may also utilizes various "operator-initiated" inputs, as generally categorized by second sensor group 64. These inputs include a brake sensor 254 for sensing when the vehicle operator is applying the brakes, a gear position sensor 256 for sensing a gear position of transmission 18, a steering angle sensor 258 for detecting the magnitude of a steering angle ($\phi$), and an accelerator sensor 260 for sensing an accelerating condition of the vehicle. Preferably, the accelerator sensor 260 is a throttle position sensor for sensing the degree of opening of a throttle valve associated with engine 16 or for sensing the degree of depression of an accelerator pedal and to produce a throttle position signal (A). The operator-initiated input signals are delivered to controller 62 where they are used, in conjunction with the system input signals.

Figure 8:
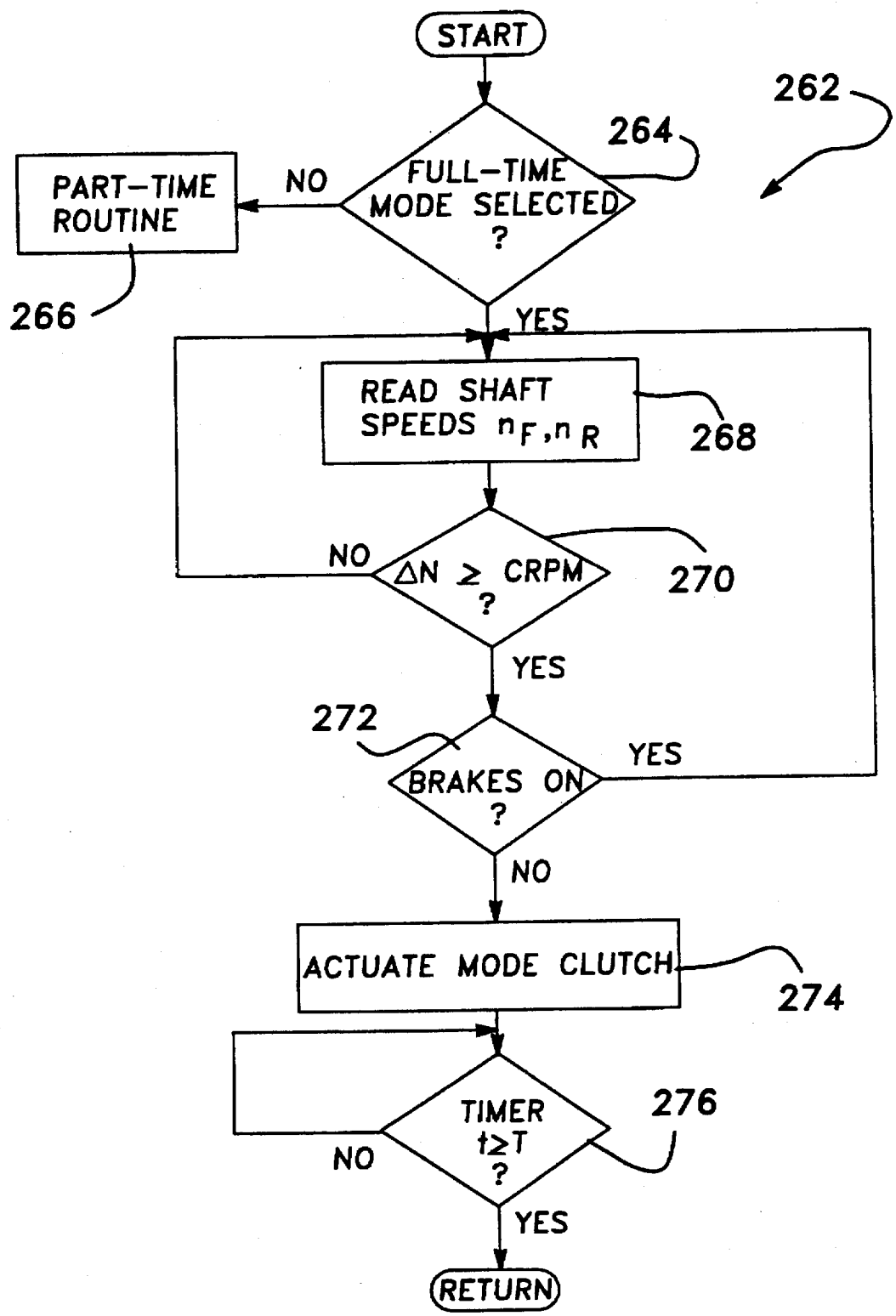
FIG. 8 is a flow chart depicting an ON/OFF control sequence for the operations performed by the electronic control system of FIG. 7.

With reference to FIG. 8, a control sequence for "on-demand" control of the full-time drive modes under the ON/OFF control scheme is shown in a flow chart 262. In general, flow chart 262 represents a sequence of operations performed by controller 62 and which are diagrammatically shown in block form. When mode select mechanism 66 signals selection of an available full-time mode, as indicated by block 264, a succession of control steps are repeated for determining the value of the control signals to be applied to the solenoid valves. Preferably, the control signal sent to third solenoid valve 224 is variable and selected in accordance with the current value of a interaxle speed differential ($\Delta N$). However, if any other mode is selected, then the control sequence jumps to a part-time routine, as indicated by block 266 which controls actuation of range clutches 52 and 54 and mode clutch 50 in the manner described.

Block 268 is representative of the control step in which the current value of the rotational speed of front drive shaft ($n_F$) and rear drive shaft ($n_r$) are read. In block 270, controller 62 determines the current value of the speed differential signal ($\Delta N$) and compares it with stored information to determine if the current value of the speed differential signal ($\Delta N$) is equal to or exceeds a predetermined threshold maximum value (CRPM). The threshold maximum value (CRPM) is selected to permit a normal amount of interaxle speed differentiation of the type typically associated with the motor vehicle be steered into a tight turn or corner. Therefore, the maximum threshold value (CRPM) is selected to permit normal interaxle speed differentiation without causing on-demand lock-up of mode clutch 50. If the current value of the speed differential ($\Delta N$) is less than the maximum threshold level (CRPM), then the control routine returns to the process step identified at block 268 to be repeated in a continuous manner. Block 272 is indicative of the input signal generated by brake sensor and delivered to controller 62. Accordingly, if the vehicle operator is attempting to stop the vehicle by applying the brakes during an occurrence of a low traction road condition (i.e., $\Delta N$ is equal to or greater than CRPM) then controller 62 prevents on-demand activation of mode clutch 50. Thus, simultaneous braking and on-demand four-wheel drive operation is prevented to provide the vehicle operator with greater control. However, during the occurrence of a low traction condition (where ΔN is equal to or greater than CRPM) and the vehicle operator is not applying the brakes, controller 62 automatically sends a control signal to third solenoid valve 224, as shown in block 274, thereby fully-actuating mode clutch 50. As shown in block 276, a timer circuit is actuated simultaneously with actuation of third solenoid valve 224 for maintaining mode clutch 50 in its actuated condition for a predetermined time period (T). Once the period of solenoid actuation (t) equals the predetermined time period (T), controller 62 repeats the control routine. Thus, mode clutch 50 will be maintained in its fully-actuated mode until the calculation at block 268 indicates that the speed differential has been reduced below the maximum threshold level.

Figure 9:
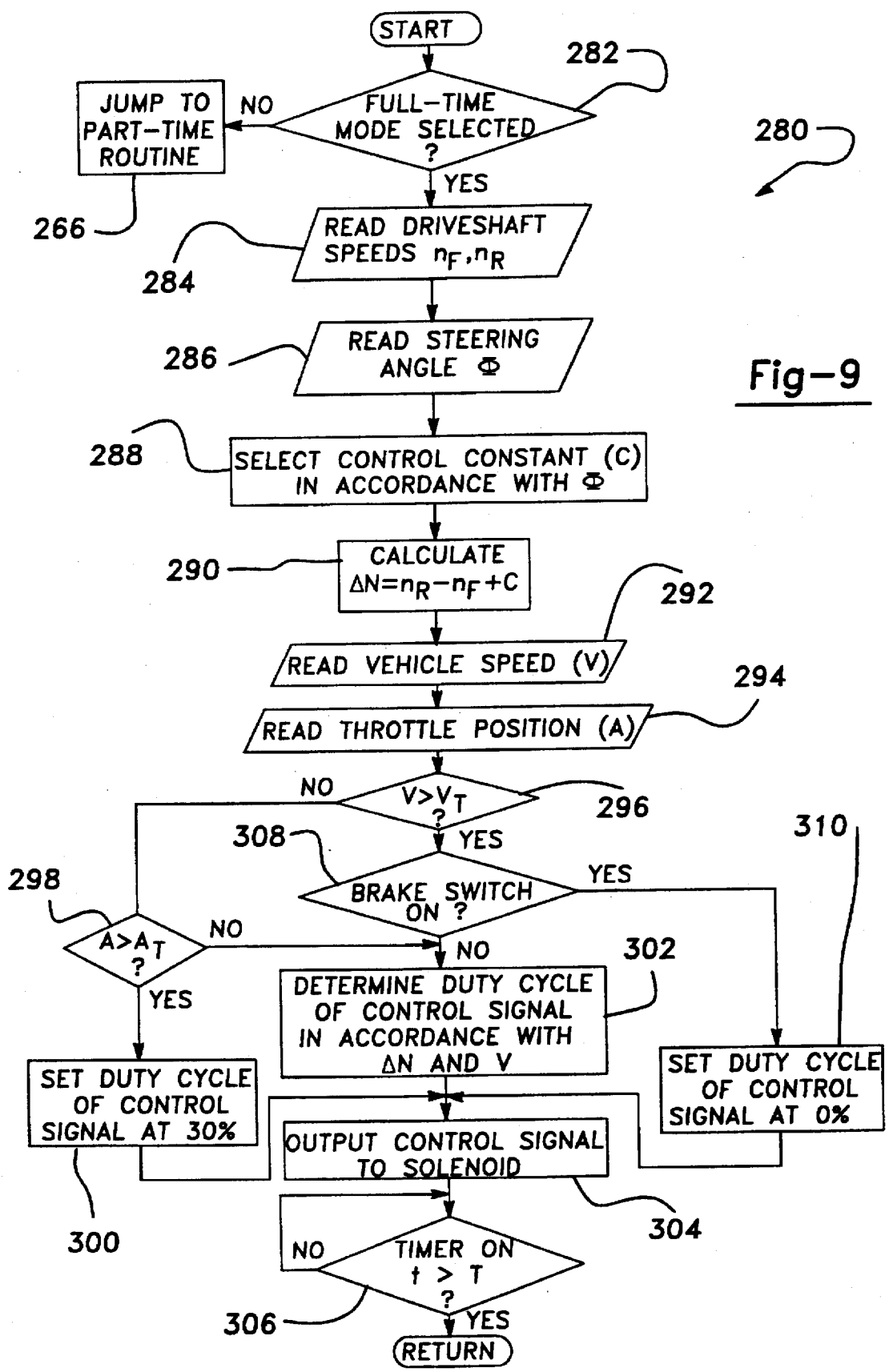
FIG. 9 is a flow chart depicting an ADAPTIVE control sequence for the operations performed by the electronic control system of FIG. 7.

With reference now to FIG. 9, a control sequence for the selection and the subsequent "on-demand" control of the full-time drive modes under the ADAPTIVE control scheme is shown in a flow chart 280. In general, flow chart 280 represents a sequence of operations performed by electronic controller 62 which are diagrammatically shown in block form. When mode select mechanism 66 signals selection of an available full-time mode, as indicated by block 282, a succession of control steps are repeated for determining the value of the control signal to be applied to third solenoid valve 224. In the preferred form, the control signal is selected in accordance with various predefined relationships between the current value of the interaxle speed differential (ΔN) and vehicle speed (V), as modified by current value of the steering angle (φ) and other operator-initiated inputs. Block 284 is representative of the control step in which the current value of the rotational speed of front drive shaft ($n_F$) and rear drive shaft ($n_R$) are read. Block 286 indicates the step of reading the value of steering angle (φ) as detected by steering angle sensor 258. Block 288 represents the operation of selecting a control characteristic (C) in accordance with the detected steering angle (φ). Next, block 290 represents the step of calculating the value of the speed differential (ΔN) according to the equation $$\Delta N = n_R - n_F + C$$

Blocks 292 and 294 indicate the steps of reading the current value of the vehicle speed (V) as detected by vehicle speed sensor 244 and the throttle position (A) as detected by throttle position sensor 260. As shown in block 296, controller 62 determines whether the vehicle speed (V) exceeds a predefined threshold value ($V_T$) such as, for example, 5 mph. If the vehicle speed is less than the threshold value ($V_T$), a second determination is made at block 298 as to whether the value of the throttle position (A) exceeds a predefined threshold value ($A_T$) such as, for example, a 50% accelerator pedal depression angle. If the vehicle speed (V) is less than its threshold value ($V_T$) and the throttle position (A) exceeds its threshold value ($A_T$), then the magnitude (i.e., percentage of duty cycle) of the electric control signal sent to third solenoid valve 224 is set as a preset value, such as 30% duty cycle, as indicated by block 300. In this manner, power transfer system 10 is adapted to transfer increased drive torque to front wheels 24 in response to quick acceleration at low vehicle speeds to inhibit anticipated wheel slip. However, if the value of the throttle position (A) is less than its threshold value ($A_T$), then the magnitude of the duty cycle for the control signal is set in accordance with predefined relationships between the speed differential (ΔN) and vehicle speed (V), as indicated by block 302. Block 304 represents the step of outputting the electric control signal to third solenoid valve 224 for developing the desired amount of torque transfer, if any, across mode clutch 50. As shown in block 306, a timer circuit actuated simultaneously with energization of third solenoid valve 224 for maintaining such energization for a predetermined time period (T). Once the period of energization (t) equals the predetermined time period (T), controller 62 repeats the control routine.

To enhance steering control, block 308 is indicative of the control step between steps 296 and 302 for determining whether the vehicle operator is applying the brakes when the vehicle speed (V) is greater than the threshold value ($V_T$). Accordingly, if the vehicle operator is attempting to stop the vehicle, by applying the brakes (as sensed by brake sensor 254) during an occurrence of a low traction road condition and the vehicle speed (V) is greater than the predefined threshold ($V_T$), then controller 62 sets the magnitude of the control signal sent to third solenoid valve 224 to zero, at block 310 for shifting mode clutch 50 into its non-actuated mode. This control sequence prevents simultaneous braking and torque-modulated full-time four-wheel drive operation for providing the vehicle operator with greater steering and braking control. However, during the occurrence of a low traction condition when brake sensor 254 signals controller 62 that the vehicle operator is not applying the brakes, then controller 62 energizes third solenoid valve 224 for actuating mode clutch 50 in accordance with the relationships generally denoted by block 302.

Figure 10:
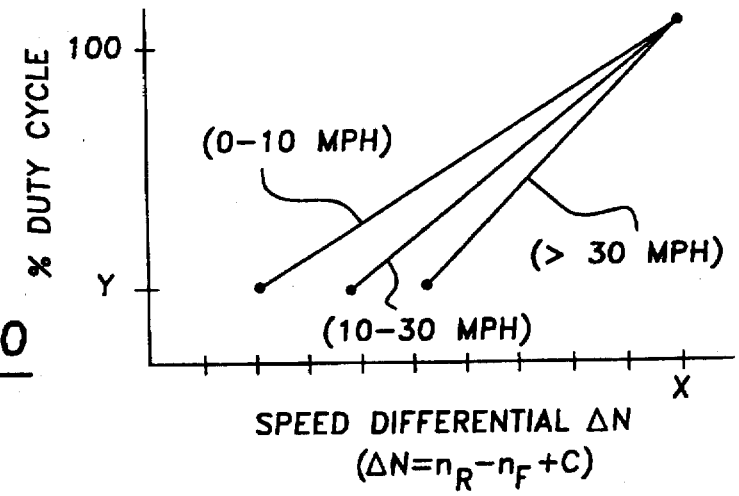
FIG. 10 illustrates plots of relationships between interaxle speed differential signals at various vehicle speed ranges and the electrical control signal supplied under the ADAPTIVE control sequence for controlling torque transferred across the clutch assembly.

With particular reference to FIG. 10, a set of plots that can be used with the ADAPTIVE control scheme for establishing the magnitude of the duty cycle for the control signal sent to third solenoid valve 224 in response to the current value of the speed differential ΔN) and the vehicle speed (V) during full-time operation, as diagrammatically referred to by block 302 in FIG. 9, will now be detailed. As seen, power transfer system 10 is programmed to correlate the percentage duty cycle of the electric control signal to a range of speed differential (ΔN) values. In general, the percentage duty cycle for the control signal increases from a minimum actuation value (Y%) to a maximum actuation value (100%) as the value of the speed differential (ΔN), within a particular vehicle speed range, increases from a minimum speed differential limit to a maximum speed differential limit (X). As such, when the value of the speed differential (ΔN) is less than the minimum speed differential limit, no drive torque is transferred through mode clutch 50. However, when the value of the speed differential (ΔN) exceeds the minimum differential limit, a control signal is supplied to third solenoid valve 224 having a duty cycle value greater than (Y%). Thus, the minimum actuation duty cycle (Y%) for the control signal correlates to the point at which sufficient frictional engagement between the interleaved clutch plates results in the delivery of a portion of the total drive torque to slower turning output shaft of transfer case 20 for initiating "on-demand" limited slip control during a full-time four-wheel drive operation. Preferably, the portion of the total drive torque transferred through mode clutch 50 to the slower turning output shaft increases as the magnitude of the duty cycle for the control signal increases from the minimum actuation value (Y%) to the maximum actuation value (100%). Preferably, the maximum value (X) of the speed differential (ΔN) correlates to the maximum actuation duty cycle (100%) at which point the maximum clutch engagement force is generated for completely locking-up mode clutch 50. Part-time routine 266 is directed to controlling power transfer system 10 when the vehicle operator selects a operational mode via mode select mechanism 66 other than one of the full-time four-wheel drive modes.

To minimize pumping losses and capacity requirements, as well as to increase mechanical efficiency, it is contemplated that first range clutch 52 could be a spring-applied direct clutch that is normally maintained in its actuated mode by a spring biasing force that is mechanically exerted on piston 110 to hold it in its engaged position. Since transfer case 20 will spend the great majority of its service life operating in one of the high-range drive modes, use of such a spring-applied direct clutch eliminates the need for pump 216 to continuously deliver pressure to first range clutch 52. As such, hydraulic pressure would only be delivered to oil chamber 112 of first range clutch 52 to move piston 110 to its released position when the vehicle operator selects operation in a low-range drive mode or in the neutral mode. As a final alternative, it is contemplated that controller 62 can be adapted to automatically control operation of powershift mechanism 46 in addition to mode clutch 50, without any input from the vehicle operator. While mode select mechanism 66 would still preferably be available for selection of part-time four-wheel drive and neutral modes, it would also permit selection of a "fully-adaptive" mode wherein range clutches 52 and 54 and mode clutch 50 are all controlled based on the sensor input signals delivered to controller 62.

The foregoing discussion discloses and describes the preferred structure and control system for the present invention. However, one skilled in the art will readily recognize from such discussion, and from the accompanying drawings and claims, that various changes, modifications and variations can be made therein without departing from the true spirit and fair scope of the invention as defined in the following claims.

What is claimed is:

1. A power transfer system for a four-wheel drive motor vehicle having a power source and front and rear drivelines, comprising:

a transfer case including a housing; an input shaft rotatably supported in said housing and driven by the power source; a front output shaft rotatably supported in said housing and coupled to the front driveline; a rear output shaft rotatably supported in said housing and coupled to the rear driveline; a quill shaft supported on said rear output shaft for rotation relative thereto; a planetary gear reduction unit operable for establishing a high-range drive mode in which said quill shaft is driven at a direct speed ratio relative to said input shaft and a low-range drive mode in which said quill shaft is driven at a reduced speed ratio relative to said input shaft, said planetary gear reduction unit having a first sun gear driven by said input shaft, a second sun gear, and a carrier assembly driving said quill shaft and having planet gears journally supported thereon intermeshed with said first and second sun gears; a first range clutch operable in an actuated mode for coupling said carrier assembly for common rotation with said input shaft and in a non-actuated mode for releasing said carrier assembly from coupled engagement with said input shaft; a second range clutch operable in an actuated mode for coupling said second sun gear to said housing to brake rotation thereof and in a non-actuated mode for releasing said second sun gear from coupled engagement with said housing; an interaxle differential interconnecting said quill shaft to said front and rear output shafts for permitting speed differentiation therebetween, said interaxle differential including a third sun gear fixed for rotation with said rear output shaft, a fourth sun gear fixed for rotation with said front output shaft, and a second carrier assembly fixed for rotation with said quill shaft and having pinion gears journally supported thereon that are meshed with said third and fourth sun gears; a mode clutch operable for controlling speed differentiation between said front and rear output shafts, said mode clutch including a set of first clutch plates supported for rotation with said front output shaft, a set of second clutch plates supported for rotation with said rear output shaft and which are alternately interleaved with said first clutch plates, a thrust mechanism movable between a first position whereat a minimum clutch engagement force is exerted on said clutch plates for permitting unrestricted speed differentiation between said front and rear output shafts and a second position whereat a maximum clutch engagement force is exerted on said clutch plates for inhibiting speed differentiation, and a biasing mechanism for normally biasing said thrust mechanism toward said first position;

sensor means for detecting dynamic and operational characteristics of the motor vehicle and generating sensor input signals indicative thereof;

a mode select mechanism for enabling a vehicle operator to select one of a full-time four-wheel high-range drive mode, a neutral mode, and a part-time four-wheel low-range drive mode, said mode select mechanism further operable for generating a mode signal indicative of the particular mode selected; and a controller for controlling actuation of each of said first and second range clutches and said mode clutch in response to said mode signal and said sensor input signals, said controller causing said first range clutch to be shifted into its actuated mode and said second range clutch to be shifted into its non-actuated mode and thereafter modulate the position of said thrust mechanism between said first and second positions as a function of said sensor input signals when said mode signal indicates selection of said full-time four-wheel high-range drive mode, wherein said controller causes said first and second range clutches to be shifted into their respective non-actuated modes and move said thrust mechanism to said first position when said mode signal indicates selection of said neutral mode, and wherein said controller causes said first range clutch to be shifted into its non-actuated mode and said second range clutch to be shifted into its actuated mode and move said thrust mechanism to said second position when said mode signal indicates selection of said part-time four-wheel low-range drive mode.

2. The power transfer system of claim 1 wherein said mode select mechanism is further operable for enabling the vehicle operator to select a part-time four-wheel high-range drive mode and generate a mode signal indicative thereof, said controller causing said first range clutch to be shifted into its actuated mode and said second range clutch to be shifted into its non-actuated mode and move said thrust mechanism to said second position when said part-time four-wheel high-range is selected.

3. The power transfer system of claim 1 wherein said mode clutch is in its non-actuated mode when said thrust mechanism is in said first position and is in its fully-actuated mode when said thrust mechanism is in said second position, and wherein the actuated condition of said mode clutch is continuously varied between said non-actuated and fully-actuated modes in response to changes in the magnitude of said sensor input signals for automatically controlling speed differentiation between said front and rear output shafts during operation in said full-time four-wheel high-range drive mode.

4. The power transfer system of claim 1 wherein said carrier assembly of said planetary gear reduction unit journally supports a set of first planet gears meshed with said first sun gear and a set of second planet gears meshed with said second sun gear, and wherein each one of said first planet gears is also meshed with one of said second planet gears.

5. The power transfer system of claim 1 wherein said first range clutch includes a first set of clutch plates interconnected for rotation with said input shaft, a second set of clutch plates interconnected for rotation with said carrier assembly and which are alternately interleaved with said first clutch plates, a piston movable between a released position whereat a minimum clutch engagement force is exerted on said interleaved clutch plates for permitting relative rotation therebetween, and an engaged position whereat a maximum clutch engagement force is exerted on said interleaved clutch plates for coupling said carrier assembly to said input shaft, and means for moving said piston between said released and engaged positions, and wherein said piston is located in said released position when said first range clutch is operating in its non-actuated mode and in said engaged position when said first range clutch is operating in its actuated mode.

6. The power transfer system of claim 5 wherein said first range clutch further comprises a biasing mechanism for normally biasing said piston toward one of said released and engaged positions.

7. The power transfer system of claim 1 wherein said second range clutch includes a first set of clutch plates fixed for rotation with said second sun gear, a second set of clutch plates coupled to said housing and which are interleaved with said first clutch plates, a piston movable between a released position whereat a minimum clutch engagement force is exerted on said clutch plates for permitting relative movement of said second sun gear relative to said housing, and an engaged position whereat a maximum clutch engagement force is exerted on said clutch plates for inhibiting rotation of said second sun gear relative to said housing, a biasing mechanism for normally biasing said piston toward said released position, and means for moving said piston between said released and engaged positions, whereby said second range clutch is operating in its non-actuated mode when said piston is in said released position and in its actuated mode when said piston is in said engaged position.

8. The power transfer system of claim 1 further comprising a hydraulic control system operable in response to control signals sent thereto from said controller for controlling the actuated condition of said first and second range clutches and said mode clutch.

9. The power transfer system of claim 1 wherein said sensor means is operative for sensing the rotational speed of said front and rear output shafts and respectively generating front and rear speed signals indicative thereof, and further wherein said controller is operative for receiving said front and rear speed signals and generating a speed differential signal that is indicative of the speed differential between said first and second outputs of said interaxle differential, said controller operable for causing said mode actuator to move said thrust mechanism to move toward said second position in response to increasing values in said speed differential signal.

10. The power transfer system of claim 1 wherein said mode clutch includes an inner drum fixed to said fourth sun gear and on which said first clutch plates are mounted, and an outer drum fixed for rotation with said rear output shaft and to which said second clutch plates are mounted, and wherein said thrust mechanism is a piston supported for movement relative to said outer drum and defining a pressure chamber therewith, and further including a source of pressurized fluid and a control valve operable in response to control signals from said controller for regulating the supply of pressurized fluid to said pressure chamber for moving said piston between said first and second positions.

11. The power transfer system of claim 9 wherein said source of pressurized fluid includes a sump area within said housing containing hydraulic fluid, and a pump assembly operable for drawing said hydraulic fluid from said sump area and supplying pressurized fluid to said control valve.

12. A power transfer system for a four-wheel drive motor vehicle having a power source and front and rear drivelines, comprising:

a transfer case including a housing; an input shaft rotatably supported in said housing and driven by the power source; a front output shaft rotatably supported in said housing and coupled to the front driveline; a rear output shaft rotatably supported in said housing and coupled to the rear driveline; a quill shaft supported on said rear output shaft for rotation relative thereto; a planetary gear reduction unit operable for establishing a high-range drive mode in which said quill shaft is driven at a direct speed ratio relative to said input shaft and a low-range drive mode in which said quill shaft is driven at a reduced speed ratio relative to said input shaft, said planetary gear reduction unit having a first sun gear driven by said input shaft, a second sun gear, and a carrier assembly coupled to said quill shaft and having planet gears journally supported thereon intermeshed with said first and second sun gears; a first range clutch operable in an actuated mode for coupling said carrier assembly for common rotation with said input shaft and in a non-actuated mode for releasing said carrier assembly from coupled engagement with said input shaft; a second range clutch operable in an actuated mode for coupling said second sun gear to said housing to brake rotation thereof and in a non-actuated mode for releasing said second sun gear from coupled engagement with said housing; an interaxle differential interconnecting said quill shaft to said front and rear output shafts for permitting speed differentiation therebetween, said interaxle differential including a first output member coupled for rotation with said rear output shaft, a second output member coupled for rotation with said front output shaft, and an input member coupling said first and second output members to said quill shaft; and a mode clutch operable in a non-actuated mode for permitting unrestricted speed differentiation between said front and rear output shafts and in a fully-actuated mode for inhibiting such speed differentiation;

sensor means for detecting dynamic and operational characteristics of the motor vehicle and generating sensor input signals indicative thereof;

a mode select mechanism for enabling a vehicle operator to select one of a full-time four-wheel high-range drive mode and a part-time four-wheel low-range drive mode, said mode select mechanism further operable for generating a mode signal indicative of the particular mode selected; and a controller for controlling actuation of each of said range clutches and said mode clutch in response to said mode signal and said sensor input signals, said controller causing said first range clutch to be shifted into its actuated mode and said second range clutch to be shifted into its non-actuated mode and thereafter modulate the actuated condition of said mode clutch as a function of said sensor input signals when said mode signal indicates selection of said full-time four-wheel high-range drive mode, and wherein said controller causes said first range clutch to be shifted into its non-actuated mode and said second range clutch to be shifted into its actuated mode and said mode clutch to be shifted into its fully-actuated mode when said mode signal indicates selection of said part-time four-wheel low-range drive mode.

13. The power transfer system of claim 12 wherein said mode select mechanism is further operable to permit selection of a neutral mode in which said mode signal causes said controller to shift said first and second range clutches and said mode clutch into their respective non-actuated modes.

14. The power transfer system of claim 12 wherein said mode select mechanism is further operable for enabling the vehicle operator to select a part-time four-wheel high-range drive mode and generate a mode signal indicative thereof, said controller causing said first range clutch to be shifted into its actuated mode and said second range clutch to be shifted into its non-actuated mode and said thrust mechanism to move to said second mode position when said part-time four-wheel high-range is selected.

15. The power transfer system of claim 12 wherein said first range clutch includes a first set of clutch plates interconnected for rotation with said input shaft, a second set of clutch plates interconnected for rotation with said carrier assembly and which are alternately interleaved with said first clutch plates, a piston movable between a released position whereat a minimum clutch engagement force is exerted on said interleaved clutch plates for permitting relative rotation therebetween, and an engaged position whereat a maximum clutch engagement force exerted on said interleaved clutch plates for coupling said carrier assembly to said input shaft, and means for moving said piston between said released and engaged positions, and wherein said piston is located in said released position when said first range clutch is operating in its non-actuated mode and in said engaged position when said first range clutch is operating in its actuated mode.

16. The power transfer system of claim 15 wherein said first range clutch further includes a biasing mechanism for normally urging said piston to move toward said engaged position.

17. The power transfer system of claim 12 wherein said second range clutch includes a first set of clutch plates fixed for rotation with said second sun gear, a second set of clutch plates coupled to said housing and which are interleaved with said first clutch plates, a piston movable between a released position whereat a minimum clutch engagement force is exerted on said interleaved clutch plates for permitting rotation of said second sun gear relative to said housing, and an engaged position whereat a maximum clutch engagement force is exerted on said clutch plates for inhibiting rotation of said second sun gear relative to said housing, a biasing mechanism for normally biasing said piston toward said released position, and means for moving said piston from said released position to said engaged position, whereby said second range clutch is operating in its non-actuated mode when said piston is in said released position and in its actuated mode when said piston is in said engaged position.

18. The power transfer system of claim 12 further comprising a hydraulic control system operating in response to control signal sent thereto from said controller for controlling the actuated condition of said first and second range clutches and said mode clutch.

19. The power transfer system of claim 12 wherein said sensor means is operative for sensing the rotational speed of said front and rear output shafts and respectively generating front and rear speed signals indicative thereof, and further wherein said controller is operative for receiving said front and rear speed signals and generating a speed differential signal that is indicative of the speed differential between said first and second output members of said interaxle differential, said controller operable for increasing the actuated conditions of said mode clutch in response to increasing values in said speed differential signal.

* * * * *